United States Patent

Pitroda et al.

[15] 3,699,264

[45] Oct. 17, 1972

[54] CONFERENCE CIRCUIT FOR PULSE CODE MODULATED TELEPHONY

[72] Inventors: Saytan G. Pitroda, Villa Park; Bernard J. Rekiere, Addison, both of Ill.

[73] Assignee: GTE Automatic Electric Laboratories Incorporated, Northlake, Ill.

[22] Filed: March 2, 1971

[21] Appl. No.: 120,152

[52] U.S. Cl. ..............................................179/18 BC

[51] Int. Cl. ..............................................H04m 3/56

[58] Field of Search....................................179/18 BC

[56] References Cited

UNITED STATES PATENTS

| | | |
|---|---|---|
| 3,508,007 | 4/1970 | Goodall et al. .........179/18 BC |
| 3,604,855 | 9/1971 | Pomerening...........179/18 BC |

*Primary Examiner*—Thomas W. Brown
*Attorney*—K. Mullerheim, B. E. Franz, Robert J. Black and Theodore C. Jay, Jr.

[57] ABSTRACT

A technique for connecting a plurality of telephone channels operated on a pulse code modulated basis, in a conference arrangement. Digital signals are not converted to analog, rather binary words are compared from the participating channels, with the largest binary number selected as the speaker.

6 Claims, 3 Drawing Figures

INVENTORS
SATYAN G. PITRODA
BERNARD J. REKIERE
BY
AGENT

COMPARISION CIRCUIT

CONFERENCE CIRCUIT FOR PULSE CODE MODULATED TELEPHONY

BACKGROUND OF THE INVENTION

1. Field of the Invention

This invention relates generally to transmission techniques in telephone communication systems, and more particularly to the combination of several pulse code modulated channels on a conference basis. At the present time the technique of combining a plurality of telephone conversations on a common basis for conferencing, is in quite extensive usage.

In general the output of an existing analog conference circuit consists of the instant sum of the input waveforms from all its participants. This output sum is then transmitted to all the participants. However each one is prevented from receiving his own waveform. Obviously to employ these analog conference techniques in a pulse code modulated telephone system, encoding and decoding hardware would be required. This method is expensive and also produces quantizing noise. With the advent of pulse code modulated telephony, particularly as employed in carrier transmission techniques today, an inexpensive and simple technique for the conferencing of pulse code modulated transmissions is desirable. Obviously to be effective and inexpensive this technique must be digital.

2. Description of the Prior Art

In general prior art analog conference circuits compare the analog signals, as noted previously, of all participants and then extend all signals to an individual participant with the exception of the signals generated by himself. A variety of schemes such as direct multiplexing, hybrid repeaters, transistorized analog circuitry, etc. have been utilized. Various solutions to the problems of cross talk, echo loss, impedance matching, sidetone, etc. have been disclosed. Some of the techniques employed are shown in U.S. Pat. Nos. 3,116,369; 3,144,518; 3,170,042 and 3,301,962. None of the techniques disclosed employ the digital approach and hence are of little significance in the filed of pulse code modulated telephony. A conference circuit for a time division multiplex telephone communication system is disclosed in U.S. Pat. No. 3,551,600. In this disclosure digital techniques are employed. However the time division signals are still in analog form and must be converted from analog to digital form and after being acted upon by the conference circuit they must be reconverted from digital to analog form. It would seem that the technique of conferencing pulse code modulated signals in a telephone system as suggested herein, is not disclosed in the prior art.

It would appear the obvious way to handle a conference call in its digital form is to apply exactly the same approach used in the analog circuits but digitally. In other words the binary sum of all inputs would be taken for outpulsing. Since present day pulse code modulated carrier equipment utilizes nonlinear coding with logarithmic characteristics, it is not possible to form an algebraic sum by simple binary addition. This technique requires nonlinear to linear code translation, binary addition and back to nonlinear code translation. The bidirectional code translation and binary addition would appear to be both expensive and undesirable. Since the inputs are simply summed, the output magnitude exceeds the limit of the accumulator and would result in overflow. The problem of overflow becomes more severe as the number of participants in the conference increases. In the additive technique, background noise from all channels naturally is added, creating an additional problem. The employment of bidirectional code translation, binary addition, overflow and additional background noise seem to be problems that indicate that the summing method for digital conferencing is less than ideal and a new technique might prove more desirable.

SUMMARY OF THE INVENTION

The technique presented herein compares binary words received from participating channels during each time frame. The channel with the largest binary number (the highest pulse amplitude modulated sample) is selected as the speaker. Even though present day commercial pulse code modulated carrier systems employ logarithmic characteristics, the above-mentioned criteria to identify a speaker would be valid. This is because the relative magnitude is still preserved with the nonlinear encoding characteristic. Thus a speaker is selected every frame by selecting the channel with the largest binary number. The binary word representing the active speaker is transmitted to all other participants during the next frame while the search for a new speaker continues. The last speaker is transmitted then to the present speaker.

It is recognized that a situation may be created where two or more participants have exactly the same binary information corresponding to the highest pulse amplitude modulated sample. In this case coding priority could be included within the scope of the present invention. In that manner the speaker with the built in priority would be processed while others are rejected. The particular technique employed for determining priority might be based on a selective algorithm or by means of particular hardware implementation.

An algorithm to select a speaker might be set up to compare the most significant bit of each channel, or to compare up to seven bits of each channel. Based on the usage of a seven-bit magnitude selector algorithm, background noise will be added based on the frequent switching between speakers. However if a one or two bit magnitude selector is employed, this system will not switch between speakers often enough and low level phrases will be lost. In an optimized system designed in accordance with the present invention the number of bits used in the magnitude selector algorithm has been studied to balance background noise and the frequency of switching speakers.

In the conference circuit disclosed herein the circuitry is attached to the highway junctor of a pulse code modulated switching center. While such switching centers do not exist at the present time considerable experimental work is being done at the present and it would appear that such systems will be employed in commercial telephony shortly. Based on the attachment of the conference circuit to the highway junctor, as noted, a participant does not have access to the circuit directly. The highway junctor acts as an intermediate switcher, or the connecter, for the connection between the circuit and the participant.

The technique shown herein provides substantial advantage over conventional analog approaches inasmuch as no loss exists in the circuit based on the usage of encoded digital signals. Other advantages would appear to exist in the form of no echo problem also due to the digital approach, as well as the elimination of amplification with its attendant problems. Amplification is not required inasmuch as signal strength is independent of the number of subscribers connected in the circuit. Since no loading effect exists the system likewise remains very stable.

In most conference circuit arrangements impedance matching becomes a serious and complex problem, again because of the encoded speech technique this problem does not exist. Because of lack of analog techniques considerably less hardware is required in the present arrangement. The circuitry being digital can be implemented using either integrated or discrete circuitry. Elaborate filters are also eliminated.

Changes in the number of participants in the present system does not require mechanical alterations, but may require a minor change in logic control.

DESCRIPTION OF THE PREFERRED EMBODIMENT

Figure 1:
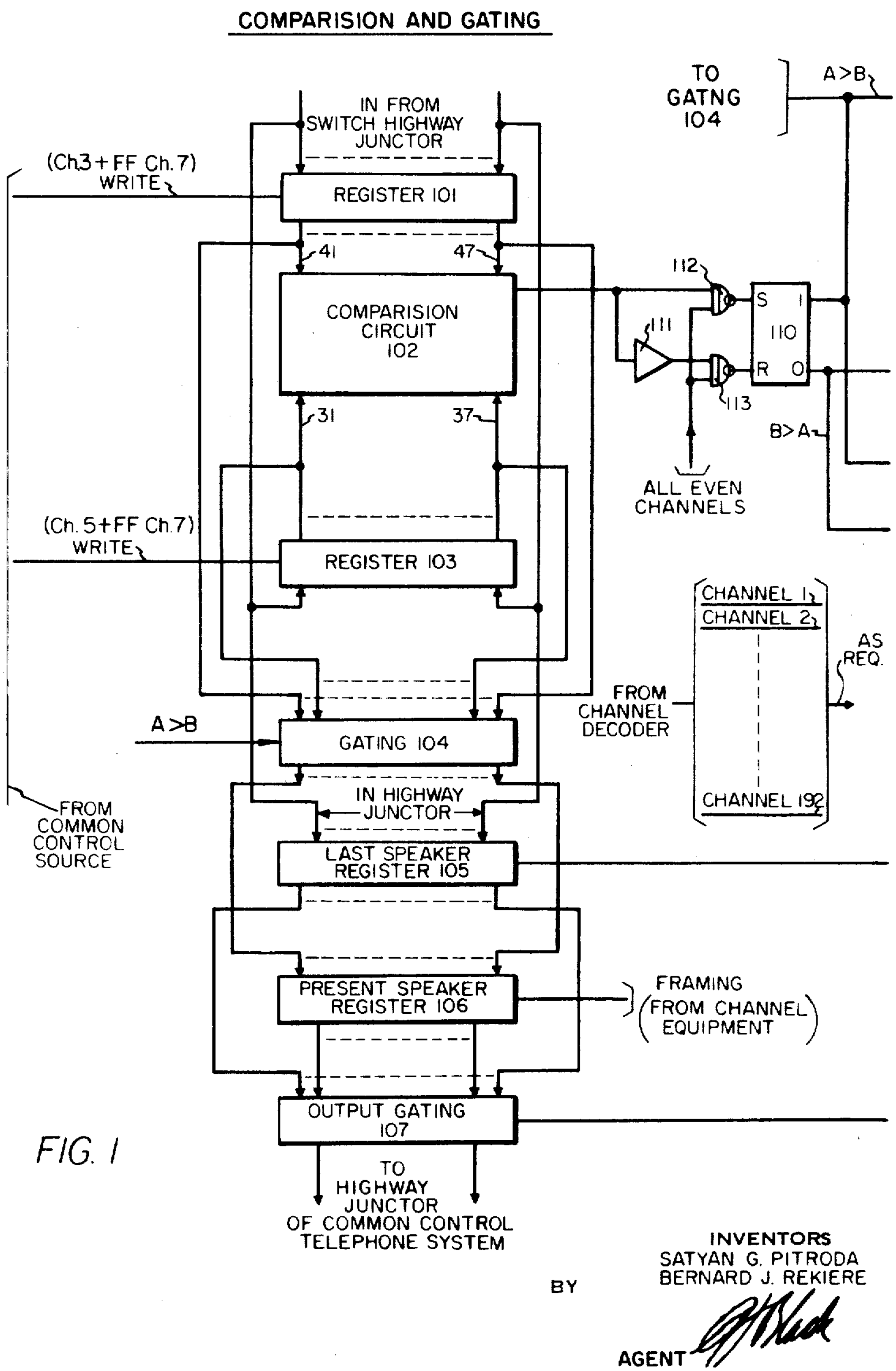
FIGS. 1 and 2 in combination, with FIG. 1 placed to the left of FIG. 2, comprise a functional diagram of a conference circuit for use in a pulse code modulated telephone system.
Figure 2:
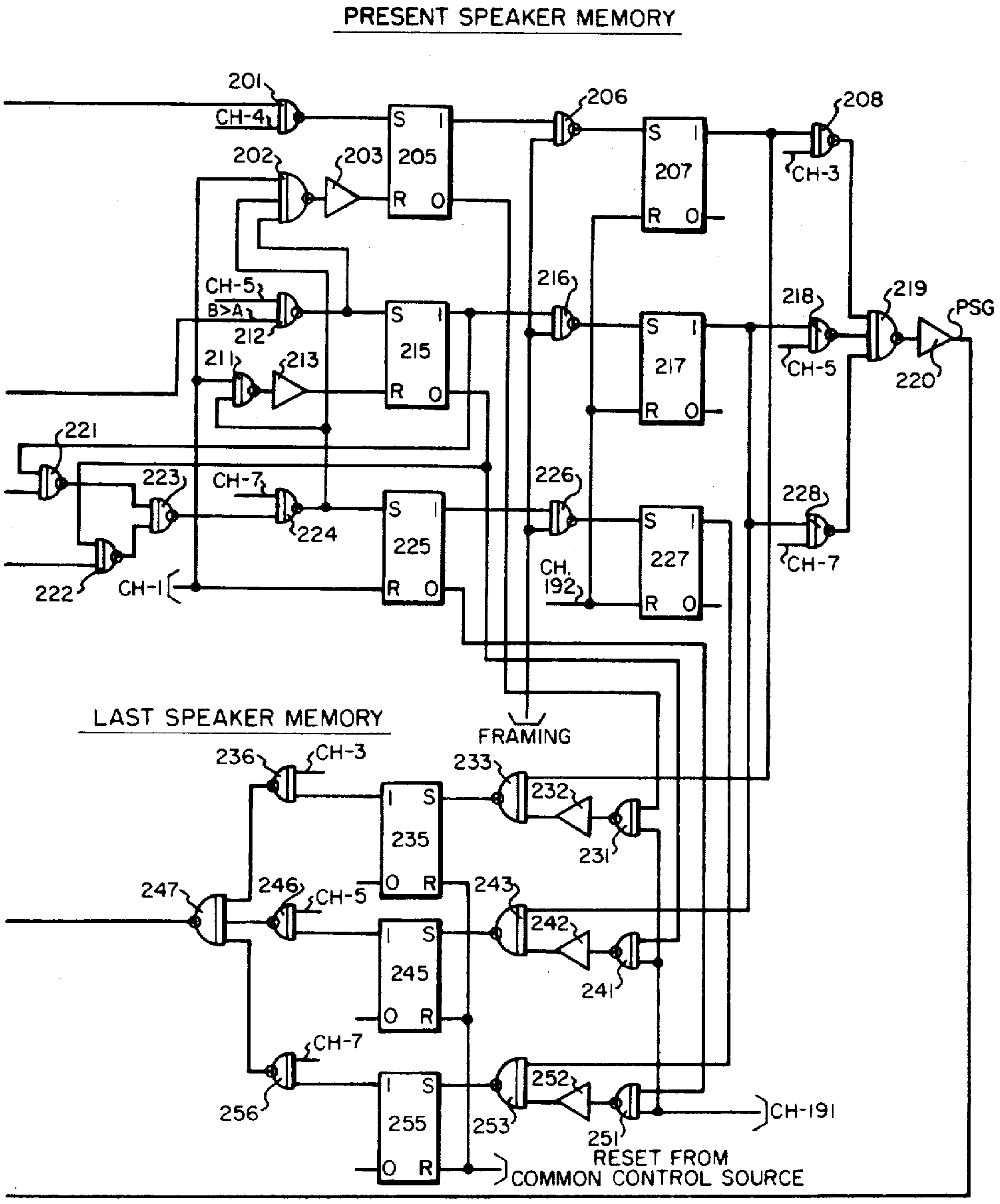
Figure 3:
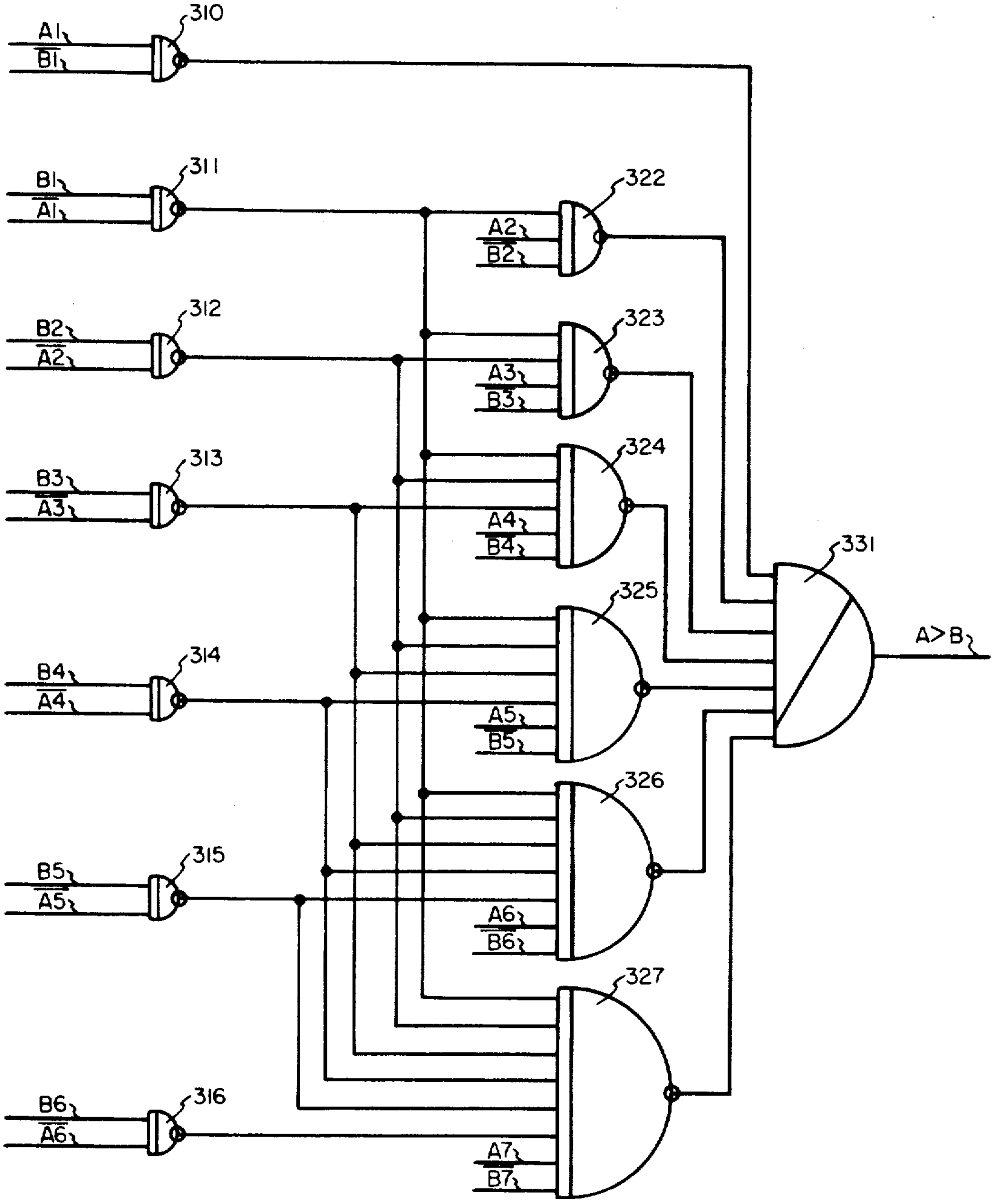
FIG. 3 is a diagram of a comparison circuit as employed in a conference circuit as shown in FIGS. 1 and 2.

Implementation of the present invention is accomplished by means of integrated or discrete circuitry arranged in logic configurations as shown in FIGS. 1, 2 and 3.

For the sake of simplicity a conference arrangement which handles three participants is discussed. The same concept however can be employed for up to six participants without considerable addition of hardware. For more than six participants additional systems similar to that shown herein can be combined on a modular basis.

The present conference circuit arrangement consists of three portions, the comparison and gating sections shown in FIG. 1 and the present-speaker memory and last-speaker memory shown in FIG. 2.

The comparison and gating circuit as shown in FIG. 1 functions to select a speaker to be transmitted through successive comparison, and provides binary information for presenting the pulse amplitude modulated sample of the last and present speakers. The comparison and gating circuit consist principally of registers 101 and 103 which are both seven-bit parallel-input, parallel-output type registers of conventional design. These registers handle the incoming information. The comparison circuit 102 as shown in detail in FIG. 3 is primarily a gating arrangement for comparing the contents of registers 101 and registers 103 in search of the channel with the largest binary number content. The last-speaker register 105 and present-speaker register 106 are similar in construction to registers 101 and 103 and store information for transmission during the next operational frame. The output gating circuit 107 provides appropriate information to the telephone system's highway junctor.

For purposes of discussion let us assume that participants engaged in a conference originate during odd numbered time slots, such as channel 3, channel 5, channel 7. In this instance the time slot number is designated as a channel number. This should not be confused with the conventional pulse code modulated carrier system channels. In conventional pulse code modulated carrier systems in operation at the present time 24 channels, each 5.2 microseconds wide are employed, while the highway junctor in a typical switching system might have 192 channels, each 650 nanoseconds wide.

Initially registers 101 and 103 which hold the binary word representing the pulse amplitude modulated sample are cleared. During channel 3 as determined from the common control source and the channel decoding equipment, information from the highway junctor is written into register 101. During all even channels, a comparison is made between the contents of register 101 and register 103; if the contents of register 101 is greater than register 103, flip-flop 110 will be set. If the contents of register 101 are less than that of register 103, flip-flop 110 will be reset. Initially flip-flop 110 is set since the contents of register 101 is bound to be greater than that of register 103, since register 103 was cleared initially. During the next odd channel, channel 5, the next participant is stored in register 103 and a similar comparison is again made. At this time if the contents of register 101 exceed that of register 103, the next channel will be written in register 103, or if register 103 is greater than register 102 it will be written in register 101. The principal function is to write updated information in that register which contains the smaller binary number. This allows successive comparisons with minimum hardware for the comparison circuit 102. Assuming that the last participating channel is written in register 103, the final comparison between register 101 and register 103 will decide which speaker or participant will be selected for transmission during the next frame.

The last-speaker memory shown in FIG. 2, which will be discussed later, provides the channel number of the last speaker. At the appropriate time, based on information provided by the last-speaker memory, information from the highway junctor is directly written into the last-speaker register 105. Present speaker information is available from register 101 or register 103. Depending upon the state of flip-flop 110 this information is gated through to the present-speaker register of 106. The output gating circuit 107 is provided to send information to the highway junctor from the present speaker or the last-speaker register.

The present-speaker memory of FIG. 2 provides a time duration pulse, PSG which indicates the time at which the information regarding the last speaker should be outpulsed to the telephone system. The logic is such that the information regarding the present speaker is transmitted to all the participants except the speaker himself. The last-speaker information is transmitted to the present speaker.

Referring now to FIG. 2, the present-speaker memory at the top of FIG. 2 functions to identify the speaker during a time frame (t) with the help of the comparison flip-flop 110 of FIG. 1. The present-speaker memory also remembers the selected speaker during the advanced time frame ($t$+1) and provides the timing pulse PSG (present-speaker gating). Time pulse PSG indicates that information being transmitted at this time is going to be received by the present speaker. The PSG pulse is used at the comparison and gating circuits to insure that the last speaker information is transmitted to the present speaker.

The present-speaker memory circuit consists of a set of flip-flops 205, 215 and 225 for a particular time frame and additional flip-flops 207, 217 and 227 for time frame ($t$+1). The number of flip-flops in each set correspond to the number of participants engaged in the conference. Thus each participant has a flip-flop in each time frame ($t$) and ($t$+1).

The state of the comparison flip-flop 110 is examined during the corresponding even channel for each participant. For example for participant in channel 3 the flip-flop 110 is examined during channel 4. If the contents of register 101 are greater than that of register 103, flip-flop 205 will be set. During the next even channel if the contents of register 103 are greater than that of register 101, 86 flip-flop 215 is set and at the same time, because of the logic arrangement involved, flip-flop 205 will be reset. The state of flip-flop 215 determines the type of information required from the comparison flip-flop 110 for flip-flop 225. If flip-flop 215 is set, register 101 containing a content greater than that of register 103 would identify the last participant as the speaker, or if flip-flop 215 is reset, register 103 with a content greater than that of register 102 would identify the speaker. That pulse used to set flip-flop 225 while setting flip-flop 225 will also reset flip-flop 205 or flip-flop 215. This resetting procedure allows only one flip-flop in the "on" state at the end of the comparison. The "on" flip-flop represents the speaker in the corresponding channel during the time frame ($t$+1). During a framing pulse received from the telephone system common control equipment, information regarding the speaker is transferred to the ($t$+1) flip-flops 207, 217, 227. Each time channel 1 time occurs, the initial flip-flops 205, 215 and 225 are reset to use during the succeeding frame. Output of the flip-flops 207, 217 and 227 are gated at their appropriate channel time under control of the channel decoder equipment to provide the PSG or present-speaker gating pulse. These flip-flops are reset during channel 192 just prior to the framing time.

The last-speaker memory circuitry shown at the bottom of FIG. 2 functions to identify and register the last speaker. It also provides the timing pulse LSG (last speaker gating) for the comparison and gating circuitry of FIG. 1. At the time provided by the LSG pulse, the information from the highway junctor of the telephone system is written into the last-speaker register 105. This is required to insure proper transmission to the present speaker. A participant in channel 3 is identified as the last speaker for the next frame if the following condition is established. Flip-flop 207 is "on" indicating that the speaker is in channel 3 and the flip-flop 205 is "off," after the required comparison for the respective frame, indicating that the speaker in the next frame is not in channel 3.

The last speaker is registered by simply setting the last speaker flip-flop 235, 245 or 255 which is reset every frame at the appropriate time. The state of the last speaker flip-flops, such as 235, 245 and 255, is gated with the corresponding channel number to provide the last speaker gating pulse LSG. The last speaker is the one who was using the conference circuit before the present speaker was identified. The last speaker is not necessarily the one who was sent during the last frame.

The conference circuit arrangement in accordance with the present invention is connected to a highway junctor of the network in a common control switching system. The incoming line therefore communicates with the highway junctor and the highway junctor in turn communicates with the conference circuit. Thus it is obvious that the present arrangement is usable by any and all participants having access to the telephone system through the highway junctor. The circuit described herein is an example of the proposed technique. Inasmuch as the parameters of pulse code modulation switching systems have not been firmly established, the timing used here may not result in the most efficient and economic operation, however the general arrangement has been determined to be workable and all of the logic blocks in the system may be implemented based on current state of the art capability of the electronic industry. The particular logic for the gating circuits and registers is not shown for the sake of simplicity.

What is claimed is:

1. In a pulse code modulated communication system, a plurality of communication channels arranged on a multiplex basis, a switching system including a junctor accessed by said communication channels and a conference circuit connected to said junctor, said conference circuit comprising: a comparison circuit; first and second registers, each including a plurality of input circuit connections extending to said junctor and each including a plurality of output circuit connections to said comparison circuit; the binary value of information from each of said channels conducted through said junctor sequentially to said conference circuit; said information stored in said registers on a step-by-step comparative basis, wherein the higher value information from any of two channels is retained in one of said registers, and the lower value of said information is released from said other register, said releasing register storing information from another channel for further comparison with the information stored in said retaining register; said retaining and releasing of information from said registers controlled in response to a determination of which of said registers contains the higher value of said information, by said comparison means; the information from that channel having the highest value of information transmitted during a particular time period, retransmitted from said conference circuit through said junctor to all of said channels, except said channel originating said highest binary value information.

2. The combination as claimed in claim 1 wherein said conference circuit includes: a present-speaker memory connected to said channels, and to said comparison means, operated in response to said comparison means to identify said channel originating the highest binary value of information during said particular time period.

3. The combination as claimed in claim 2 wherein said conference circuit further includes: a last-speaker memory connected to said present-speaker memory, operated in response to said present-speaker memory to identify the channel originating the highest binary value of information during that period immediately preceding said particular period during which said present-speaker memory identified said channel originating said highest value of information.

4. The combination as claimed in claim 3 wherein said conference circuit further includes: first gating means including a plurality of input circuit connections from said first and said second registers, and a circuit connection to said comparison circuit; a third register connected to the output of said first gating means; said gating means operated in response to said comparison means to conduct information from that register containing the higher value of binary information as determined by said comparison circuit, through said gating means to said third register, to store said higher value of information in said third register.

5. The combination as claimed in claim 4 wherein said conference circuit further includes: second gating means having a plurality of input connections from said third register and a plurality of output connections to said telephone switching system junctor, said output gating means operated in response to said present-speaker memory to extend said information stored in said third register to all of said channels except said channel originating said highest binary value information.

6. The combination as claimed in claim 5 wherein said conference circuit further includes: a fourth register including a plurality of input circuit connections from said highway junctor and a plurality of output circuit connections to said second gating means; said fourth register also including an operating circuit connection from said last-speaker memory; said fourth register operated in response to said last-speaker memory to conduct the highest value of binary information from the time period preceding said particular time period, to said channel containing said highest value of binary information during said particular period.

* * * * *